United States Patent [19]
Nielsen et al.

[11] Patent Number: 5,913,280
[45] Date of Patent: Jun. 22, 1999

[54] METHOD AND SYSTEM FOR TOWING MULTIPLE STREAMERS

[75] Inventors: Einar Nielsen, Sandvika, Norway; Michael J. Russell, New Milton, United Kingdom

[73] Assignee: Petroleum Geo-Services (US), Inc., Houston, Tex.

[21] Appl. No.: 08/919,754

[22] Filed: Aug. 28, 1997

[51] Int. Cl.⁶ ................................................ B63B 21/66
[52] U.S. Cl. ............................................. 114/242; 367/16
[58] Field of Search ...................... 114/242, 244, 114/245, 253, 246; 367/16, 18, 20

[56] References Cited

U.S. PATENT DOCUMENTS

| | | | |
|---|---|---|---|
| 4,729,333 | 3/1988 | Kirby et al. | 114/246 |
| 4,890,568 | 1/1990 | Dolengowski | 114/246 |
| 5,408,947 | 4/1995 | Curto et al. | 114/253 |

FOREIGN PATENT DOCUMENTS

| | | | |
|---|---|---|---|
| 2128328 | 4/1984 | United Kingdom | 114/242 |
| 9621166 | 7/1996 | WIPO. | |

*Primary Examiner*—Jesus D. Sotelo
*Attorney, Agent, or Firm*—Arnold & Associates

[57] ABSTRACT

Methods, systems, and towing bridles, are provided to increase spread width, streamer separation, and number in marine seismic data acquisition. The invention is applicable for towing seismic equipment behind a marine seismic data equipment handling vessel along a data acquisition path, the system comprising: a deflector attached to a deflector line; an equipment handling vessel attached to the deflector; a deflector line pulling vessel attached to the deflector line; and the marine seismic data equipment attached to the deflector line.

27 Claims, 4 Drawing Sheets

METHOD AND SYSTEM FOR TOWING MULTIPLE STREAMERS

BACKGROUND OF THE INVENTION

This invention relates to the field of marine seismic data acquisition and specifically to the towing of multiple streamers of seismic receivers.

In the field of marine seismic data acquisition, streamers of receivers (usually, hydrophones) are towed through the water, receiving reflected and refracted signals from signal sources (usually, air guns). It has long been desired to increase the amount of streamers, sources, and other equipment that is towed in a survey, and various methods have been proposed. For example, European Patent Application No. 0 154 968 A2, incorporated herein by reference, discloses a method of towing one streamer with a "mother" vessel, and another streamer with a slave, submerged drone. However, such as system is difficult to control and handle, and it requires specialized equipment. Other systems have been used where multiple surface vessels tow streamers side-by-side. However, such systems are also more complicated and expensive, requiring streamers to be handled on both vessels, thus requiring a full streamer handling crew.

In practice, the most common form of towing multiple streamers is for one boat to do all of the towing. Various systems have been used for such a purpose, using various hull configurations, booms, outriggers, etc. Whatever the hull configuration, one common system, seen in FIG. 1A (where only the port side of a streamer system is shown for simplicity, the starboard side being a mirror of the port side), is to use a deflector 11 (a.k.a. "otter-board" and "paravane") to pull a deflector line 18 (in this case, a rope), laterally from the path of the vessel 14a. Streamers 10a–10d are attached to the deflector line 18. Each streamer is attached to the deflector line by a slideable mount 17 (known to those of skill in the art), which is, in turn, attached to the deflector line 18 by, for example, a rope 15a–15d.

It will be appreciated that such a system has a limit to the number of streamers 10 that can be towed at a given spacing "s" between the streamers 10, because the drag of the streamers 10 counteracts the force the deflector 11 exerts perpendicular to the path of the vessel 14a. And, as deflector angle of attack increases, to exert more force perpendicular to the path of the vessel 14a, the amount of drag also increases, resulting in reduced speed of the vessel 14a and/or a reduced amount of equipment that can be towed. Further still, it will be appreciated by those of skill in the art that control of the in-line offset of a streamer spread is important. As streamers are spaced wider and wider, the in-line offset increases beyond a desired length.

Therefore, there is a continuing, long-felt need for a marine seismic data acquisition system and method that will allow for the increase in the number of streamers that can be towed and the width of the spread, and, in general, there is a need for a system that will allow for an increase in the drag caused by the amount or distribution of equipment placed perpendicular from the path of the vessel, whether that drag is caused by additional streamers, longer streamers, or some other equipment.

SUMMARY OF THE INVENTION

It is an object of the present invention to address the above-described problems through various aspects of the present invention. Therefore, according to one aspect, there is provided a towing harness for use with a seismic streamer equipment handling vessel and a supplementary vessel, the harness comprising:

an equipment handling vessel spur;

a deflector spur connected to said equipment handling spur; and a supplementary vessel spur connected to said equipment handling spur and said deflector spur.

According to a further aspect of the present invention, there is provided a system for towing seismic equipment behind a marine seismic data equipment handling vessel along a data acquisition path, the system comprising:

a deflector attached to a deflector line;

an equipment handling vessel attached to the deflector line; and a deflector line pulling vessel attached to the deflector line;

wherein the marine seismic data equipment is attached to the deflector line.

According to still a further aspect of the invention, a method is provided for towing seismic equipment behind a marine seismic data equipment handling vessel along a data acquisition path, wherein the equipment comprises, a deflector, attached to a deflector line, which is attached to the equipment handling vessel, the method comprising:

attaching a deflector line pulling vessel to the deflector line;

spacing the deflector line pulling vessel parallel to the data acquisition path; and pulling the deflector line, with a set of seismic data equipment attached thereto, with both the equipment handling vessel and the deflector line pulling vessel.

DESCRIPTION OF THE DRAWINGS

For a more complete understanding of the present invention and for further advantages thereof, reference is made to the following Detailed Description of Example Embodiments, taken in conjunction with the accompanying drawings, in which.

It is to be noted, however, that the appended drawings illustrate only typical embodiments of this invention and are therefore not to be considered limiting of its scope, for the invention may admit to other equally effective embodiments.

DETAILED DESCRIPTION OF EXAMPLE EMBODIMENTS

Figure 1A:
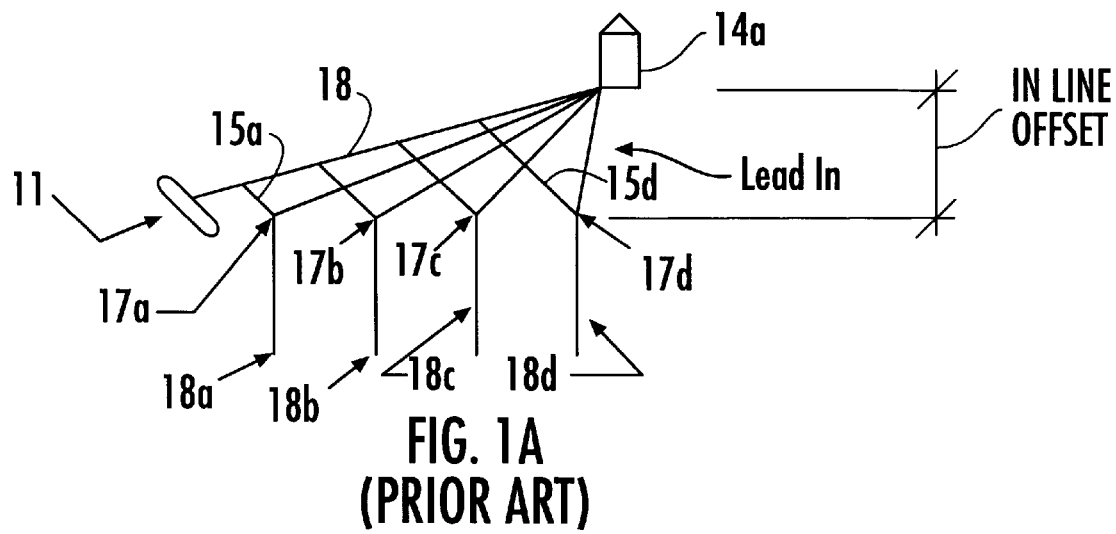
FIGS. 1A–1C are a top views of embodiments of the present invention.
Figure 1B:
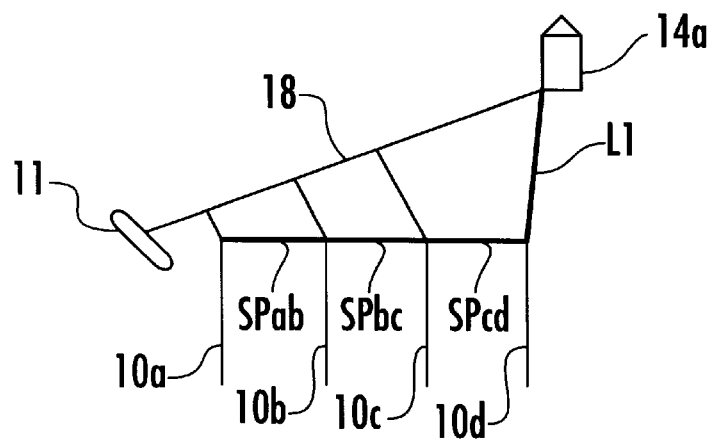
Figure 1C:
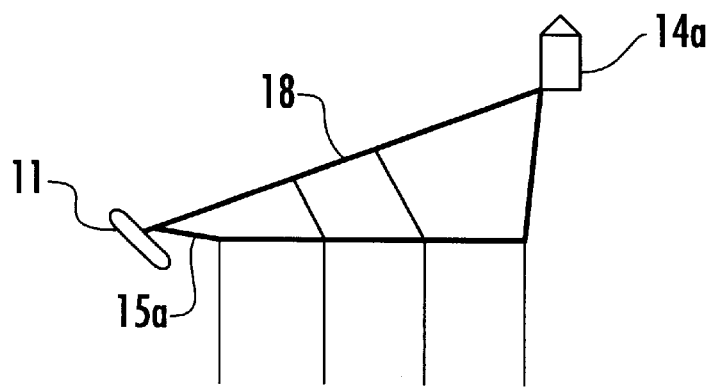

Referring now to FIG. 1B, a streamer configuration different from that shown in FIG. 1A is seen, which is more fully described in U.S. patent application Ser. No. 08/668, 361, incorporated herein by reference, in which each streamer 10 does not have its own lead-in, as in the system of FIG. 1A. In the system of FIG. 1B, each streamer 10a–10d is connected by spreaders SPab, SPbc, SPcd to a single lead-in, LI, which carries power and data signals to/from the streamers 10. The spreaders SP are active in that they convey power and data signals to/from the streamers 10 to the lead-in, LI. In an alternative embodiment, seen in FIG. 1C, the deflector line 18 (a.k.a., a "superwide" or "S.W.") is also an active lead-in, as is attachment line 15a. While the configurations of FIGS. 1B–1C reduce drag, they are still limited by the ability of the paravane 11 to deflect the assembly laterally from the path of the vessel 14a.

Following, embodiments of the present invention are described with reference to one streamer configuration. However, it should be understood that the invention is equally applicable to other streamer configurations, such as, for example, all the configurations of FIGS. 1A–1C.

Figure 2:
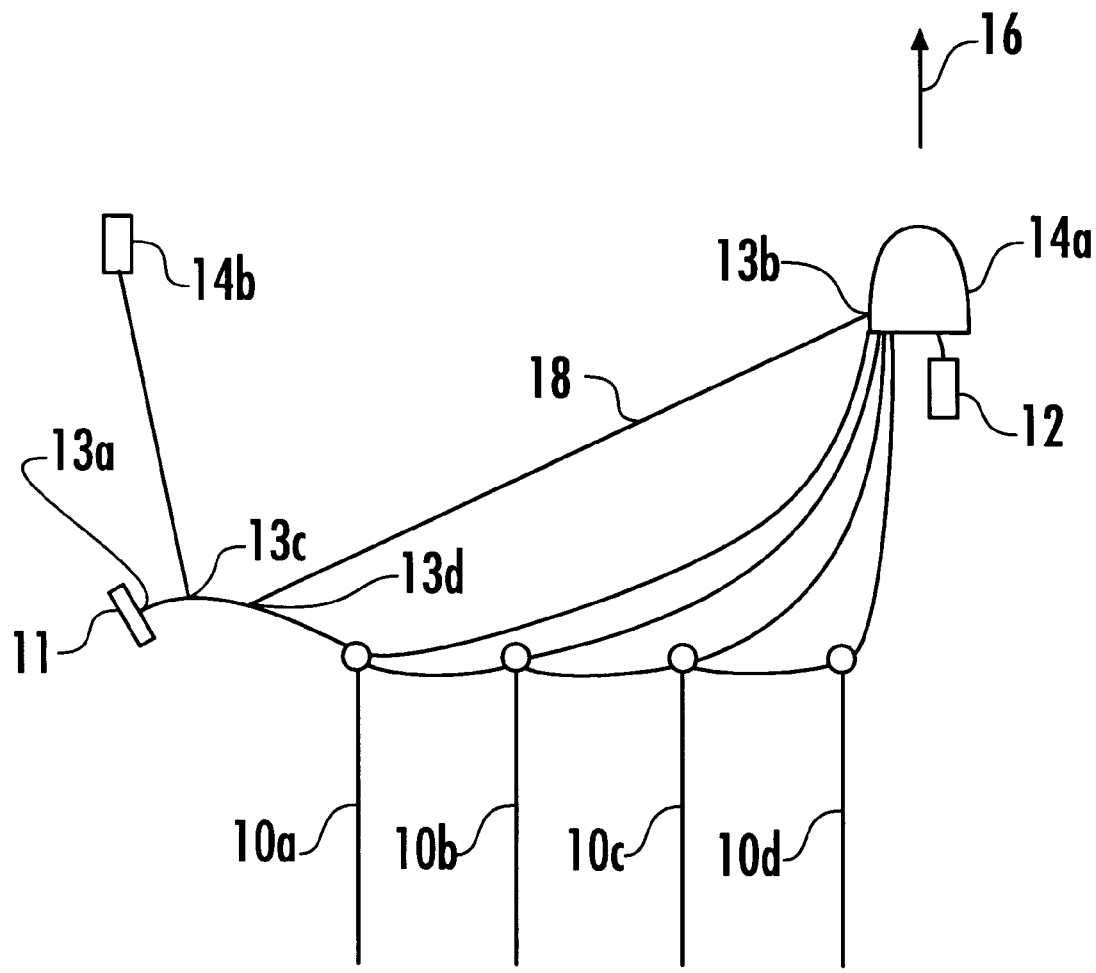
FIG. 2 is a top view of an embodiment of the invention.

Referring now to FIG. 2, an example of a system is shown for towing seismic equipment (e.g. streamers 10 and sources 12) behind a marine seismic data equipment handling vessel 14a along a data acquisition path 16. Again, only the port side is shown. According to this example, the system comprises: a deflector 11 attached to a deflector line 18 by any attachment means 13a; another attachment means 13b for attaching the deflector line 18 to the equipment handling vessel 14a; a further attachment means 13c for attaching a deflector line pulling vessel 14b to the deflector line 18; and, still further, attachment means 13d for attaching the marine seismic data equipment (e.g. the streamers 10) to the deflector line 18. Acceptable embodiments of attachment means 13a–13d are known to those of skill in the art and, although some examples are described below, the invention is not limited to such examples.

Figure 3A:
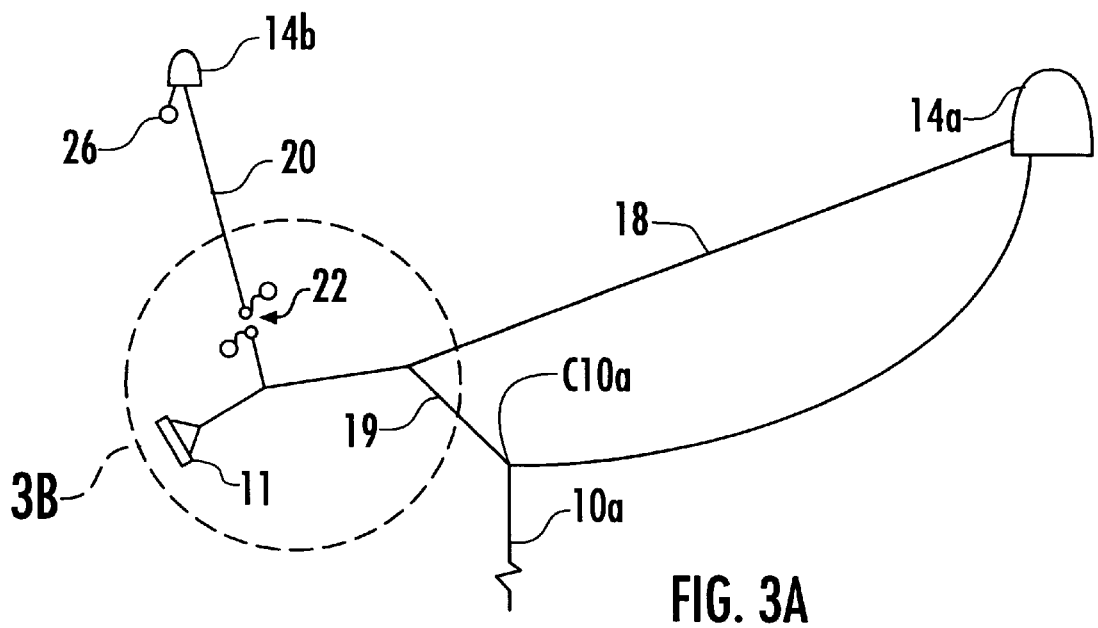
FIG. 3A is a top view of an example embodiment of the invention
Figure 3B:
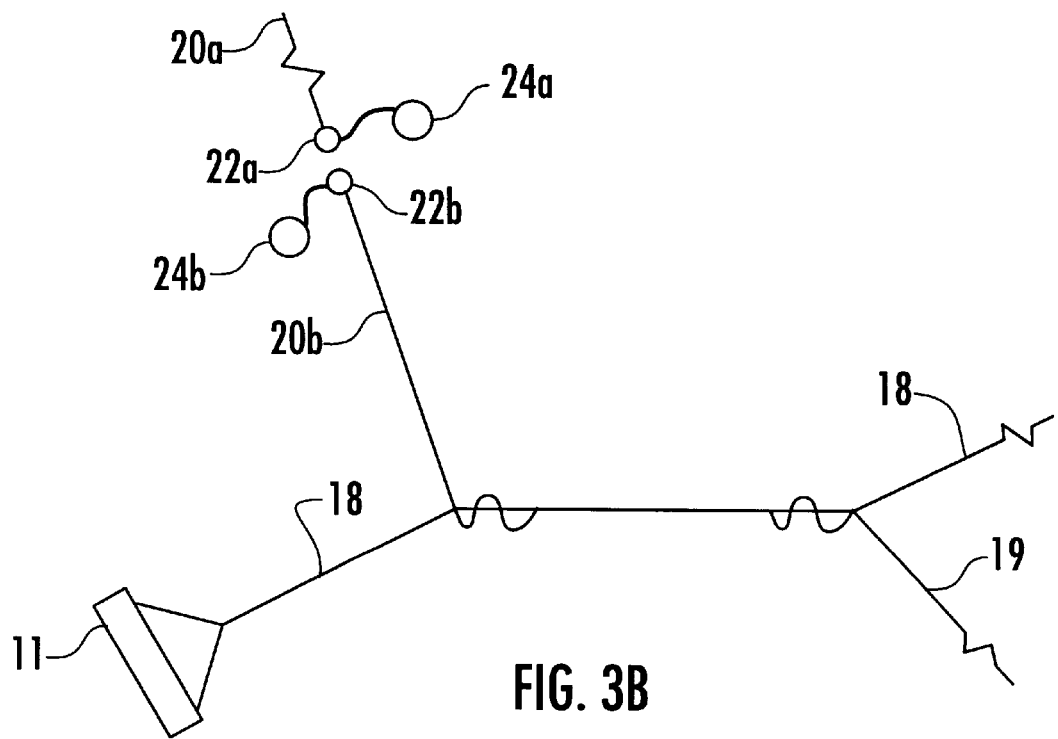
FIG. 3B is a top view of yet another embodiment of the invention.

Referring now to FIG. 3A, an example embodiment of attachment means 13c, for attaching a deflector line pulling vessel 14b to the deflector line 18, is shown. In this embodiment, the attachment means 13c comprises a tow line 20, attached to the deflector line pulling vessel 14b, and a detachable connector 22, attached between the tow line 20 and deflector line 18. Referring now to FIG. 3B, a detail of the circled portion of FIG. 3A is shown, wherein the connection to the deflector line 18 comprises line spur 20b, which is spliced into the deflector line 18 about ten meters from the deflector and about ten meters from a tow spur line 19, which, as seen in FIG. 3A, is attached to the outermost streamer 10a and its lead-in a clamp C10a. Like line spur 20b, tow spur line 19, is spliced into deflector line 18 by methods known to those of skill in the art.

According to this embodiment, the detachable connector 22 has a first end 22a and a second end 22b, the first end 22a being detachable from the second end 22b, wherein the first end 22a is connected to the tow line portion 20a, and the second end 22b of the detachable connector 22 is attached to the deflector line 18, through line spur portion 20b.

Referring still to FIG. 3B, the example system also includes a float 24a, which is attached to the first end 22a of the detachable connector 22 by a five meter pennant. Also seen is a second float 24b, attached to the second end of detachable connector 22 by a similar pennant. Various types of pennants and floats are acceptable for both ends of detachable connector 22, all of which will occur to those of skill in the art. Further, the use of the floats 24a and 24b will be evident to those of skill in the art for attachment of crane hooks and other equipment in the water for manipulation of the lines to which the first end 22a and the second end 22b of detachable connector 22 are attached.

Further, according to one example embodiment of the invention, the detachable connector 22 comprises a release device, which can be automatically activated by, for example, acoustic or radio transmission. Such devices are available from various manufacturers and their utilization is well known to those skilled in the art. When using one such release, an acoustic signal transponder 26 (FIG. 3A) is towed behind the deflector line pulling vessel 14b, and the acoustic release is responsive to the acoustic transponder 26. Control of the acoustic transponder 26 is, alternatively, on the deflector line pulling vessel 14b or the equipment handling vessel 14a. Activation of transponder 26 is made according to the invention by various methods known to those of skill in the art.

Figure 4:
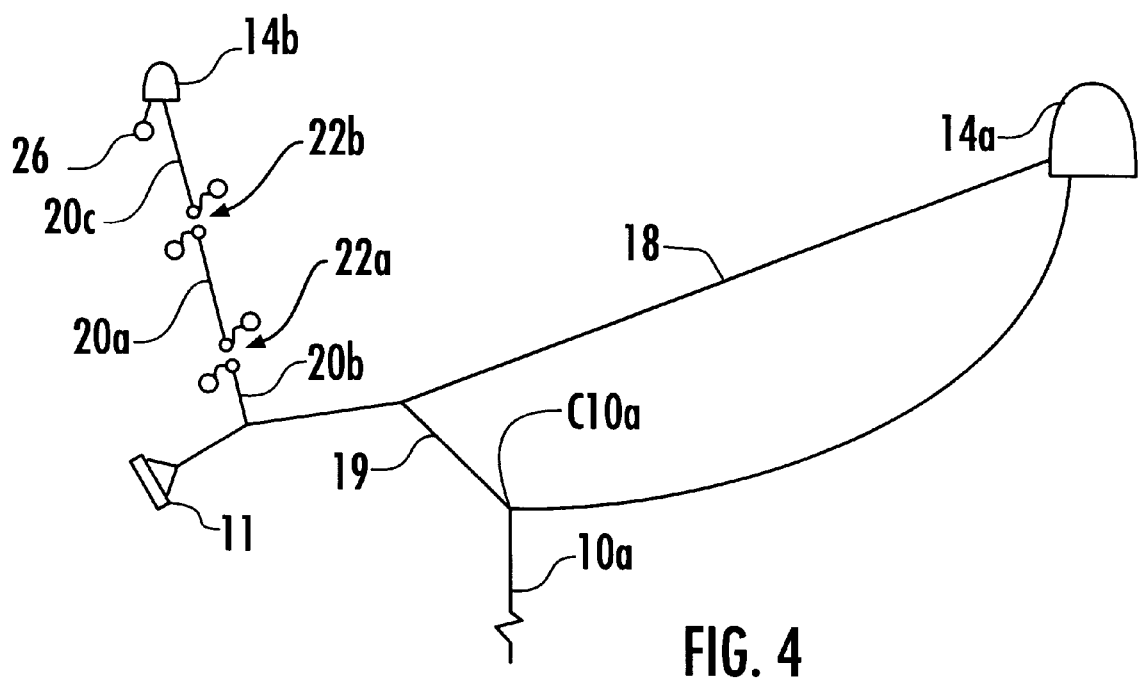
FIG. 4 is a top view of yet another embodiment of the invention.

In some embodiments, a further detachable connector is provided of similar manufacture as the first detachable connector 22. This connector is placed in the tow line 20, closer to the deflector line pulling vessel 14b, in order to have a redundant detachment means in the event of failure of the first detachable connector 22. In one embodiment, the second detachable connector is placed about fifty meters closer to the deflector line pulling vessel 14b See, e.g., FIG. 4. According to an even further embodiment, the second detachable connector is located on the deflector line pulling vessel rather than in the water. According to still further embodiments of the invention, either or both of the detachable connectors comprise acoustic releases, activated by a towed transponder. In alternative embodiments, the detachable connectors comprise mechanical releases. Other types of releases will also suffice according to alternative embodiments of the invention. In embodiments with dual detachable connectors, floats are connected to the ends of all detachable connectors, with pennants, serving the same purposes of the floats 24a and 24b, described above, as will occur to those of skill in the art.

Referring again to FIG. 2, it should also be noted that the location of the attachment 13c of the deflector line pulling vessel 14b to the deflector line 18 is between the deflector 11 and the outermost attachment (tow spur line 19, of the FIG. 4 embodiment) of an outermost streamer 10a. However, in alternative embodiments, the attachment is connected inside the outermost streamer (not shown). Further, attachments 19 of the streamers 10 take the form known to those of skill in the art for the attachment of a streamer 10 to a deflector line 18, depending on the type of streamer lead-in, as will occur to those of skill in the art. In embodiments in which an active superwide is used or a fiber-optic lead-in is used, care must be taken in making the attachment to avoid introduction of unwanted noise.

According to some embodiments of the invention, an automatic control system is used for the navigation of the deflector line pulling vessel 14b. Such automatic control may include heading and speed control, using a commercial system such as a Robertson "ROBNAV" system. This may be controlled from the integrated navigation system (such as the Concept Systems "SPECTRA" INS) of the equipment handling vessel 14a via a radio communications system. Such systems and methods are known to those of skill in the art of master/slave vessel control systems.

Referring again to FIG. 2, deflectors 11 useful in accordance with embodiments of the invention will occur to those of skill in the art, as will their set-up, which will vary depending upon the desired drag efficiency, stability, and other parameters.

Having now described an example system of the present invention, examples of another aspect of the present invention shall be described. That aspect is a method for towing seismic equipment behind a marine seismic data equipment handling vessel 14a along a data acquisition path 16, wherein the equipment comprises, a deflector 11, attached to a deflector line 18, which is attached to the equipment handling vessel 14a, the method comprising:

attaching a deflector line pulling vessel 14*b* to the deflector line 18;

spacing the deflector line pulling vessel 14*b* parallel to the data acquisition path 16; and pulling the deflector line 18, with a set of seismic data equipment 10 attached thereto, with both the equipment handling vessel 14*a* and the deflector line pulling vessel 14*b*.

According to still a further embodiment, the attaching a deflector line pulling vessel 14*b* to the deflector line 18 comprises:

attaching a tow line 20 to the deflector line pulling vessel 14*b*;

attaching a detachable connector 22 to the tow line 20,
wherein the detachable connector 22 has a first end 22*a* and a second end 22*b*, the first end being detachable from the second end, and
wherein the first end 22*a* is connected to the tow line 20;

attaching the second end 22*b* of the detachable connector 22 to the deflector line 18;

attaching a float 24*a* to the first end 22*a* of the detachable connector 22;

attaching a float 24*b* to the second end 22*b* of the detachable connector 22; and towing an acoustic signal transponder 26 behind the deflector line pulling vessel 14*b*,
wherein the acoustic signal transponder 26 activates the detachable connector 22.

According to an even further embodiment, the attaching a deflector line pulling vessel 14*b* to the deflector line 18 comprises:

attaching a tow line 20 to the deflector line pulling vessel 14*b*;

attaching a first detachable connector 22 to the tow line 20,
wherein the detachable connector 22 has a first end 22*a* and a second end 22*b*, the first end being detachable from the second end, and
wherein the first end 22*a* is connected to the intermediate tow line portion 20*a*;

attaching the second end 22*b* of the detachable connector 22 to line spur portion 20*b*;

attaching a second end of the intermediate tow line portion 20*a* to a first end 50*b* of a second detachable connector 50, wherein the second detachable connector 50 also comprises a second end 50*a*, which is detachable from the first end 50*b* of the second detachable connector 50; and attaching the second end 50*a* of the second detachable connector 50 to the tow line portion 20*c*.

According to an even further embodiment of the invention, the attaching of a deflector line pulling vessel 14*b* to the deflector line 18 comprises attaching the deflector line pulling vessel 14*b* to the deflector line 18 between the deflector 11 and an outermost attachment 53*d* of a streamer 10*a*.

According to still a further embodiment of the invention, the spacing the deflector line pulling vessel 14*b* parallel to the data acquisition path 16 comprises:

positioning the deflector line pulling vessel 14*b* and the equipment handling vessel 14*a* wherein the bow of the deflector line pulling vessel 14*b* is on a vessel alignment line ("VAL") with the bow of the equipment handling vessel 14*a* and wherein the VAL is substantially perpendicular to the data acquisition path 16.

The above example embodiments are given for illustrative purposes only, and other embodiments will occur to those of skill in the art without departing from the spirit of the present invention, as defined by the claims below.

What is claimed is:

1. A method for towing seismic equipment behind a marine seismic data equipment handling vessel along a data acquisition path, wherein the equipment comprises, a deflector, attached to a deflector line, which is attached to the equipment handling vessel, the method comprising:

attaching a deflector line pulling vessel to the deflector line;

spacing the deflector line pulling vessel parallel to the data acquisition path; and pulling the deflector line, with a set of seismic data equipment attached thereto, with both the equipment handling vessel and the deflector line pulling vessel.

2. A method as in claim 1 wherein said attaching a deflector line pulling vessel to the deflector line comprises:

attaching a tow line to the deflector line pulling vessel;

attaching a detachable connector to the tow line,
wherein the detachable connector has a first end and a second end, the first end being detachable from the second end, and
wherein the first end is connected to the tow line;

attaching the second end of the detachable connector to the deflector line.

3. A method as in claim 2 further comprising attaching a float to the first end of the detachable connector.

4. A method as in claim 2 further comprising attaching a float to the second end of the detachable connector.

5. A method as in claim 4 further comprising attaching a second float to the first end of the detachable connector.

6. A method as in claim 2 further comprising towing a detachable connector behind the deflector line pulling vessel, wherein an acoustic signal transponder activates said detachable connector.

7. A method as in claim 1 wherein said attaching a deflector line pulling vessel to the deflector line comprises:

attaching a tow line to the deflector line pulling vessel;

attaching a first detachable connector to the tow line,
wherein the first detachable connector has a first end and a second end, the first end being detachable from the second end, and
wherein the first end is connected to the deflector line;

attaching the second end of the first detachable connector to a first end of an intermediate line;

attaching a second end of the intermediate line to a first end of a second detachable connector, wherein the second detachable connector also comprises a second end which is detachable from the first end of the second detachable connector; and attaching the second end of the second detachable connector to the tow line.

8. A method as in claim 7 wherein said first detachable connector comprises a release device.

9. A method as in claim 1 wherein said attaching a deflector line pulling vessel to the deflector line comprises attaching the deflector line pulling vessel to the deflector line between the deflector and an outermost attachment of a streamer.

10. A method as in claim 1 further comprising controlling the deflector line pulling vessel from the equipment handling vessel.

11. A system for towing seismic equipment behind a marine seismic data equipment handling vessel along a data acquisition path, the system comprising:

a deflector attached to a deflector line;

an equipment handling vessel attached to the deflector line; and a deflector line pulling vessel attached to the deflector line, wherein the marine seismic data equipment is attached to the deflector line.

12. A system as in claim 11 further comprising:

a tow line attached to the deflector line pulling vessel;

a detachable connector attached to the tow line, wherein the detachable connector has a first end and a second end, the first end being detachable from the second end, wherein the first end is connected to the tow line, and the second end of the detachable connector is attached to the deflector line.

13. A system as in claim 12 further comprising a float attached to the first end of the detachable connector.

14. A system as in claim 12 further comprising a float attached to the second end of the detachable connector.

15. A system as in claim 14 further comprising a second float attached to the first end of the detachable connector.

16. A system as in claim 12 wherein said detachable connector comprises a release device.

17. A system as in claim 16 further comprising an acoustic transponder towed behind the deflector line pulling vessel, wherein said release device is responsive to said acoustic transponder.

18. A system as in claim 11 further comprising:

a tow line attached to the deflector line pulling vessel;

a first detachable connector attached to the tow line, wherein the detachable connector has a first end and a second end, the first end being detachable from the second end, wherein the first end is connected to the deflector line, the second end of the detachable connector is attached to a first end of an intermediate line;

a second end of the intermediate line attached to a first end of a second detachable connector, wherein the second detachable connector also comprises a second end which is detachable from the first end of the second detachable connector and wherein the second end of the second detachable connector is attached to the tow line.

19. A system as in claim 12 wherein said deflector line pulling vessel is attached to the deflector line between the deflector and an outermost attachment of a streamer.

20. A towing harness for use with a seismic streamer equipment handling vessel and a supplementary vessel, the harness comprising:

an equipment handling vessel spur;

a deflector spur connected to said equipment handling spur; and a supplementary vessel spur connected to said equipment handling spur and said deflector spur.

21. A harness as in claim 20 wherein:

said supplementary vessel spur comprises a detachable connector having a first end and a second end;

the first end of the detachable connector is detachable from the second end of the detachable connector;

the first end of the detachable connector is connected to a vessel portion of the supplementary vessel spur; and the second end of the detachable connector is connected to a deflector portion of the supplementary vessel spur.

22. A harness as in claim 21 wherein said detachable connector comprises an acoustic release.

23. A harness as in claim 21 wherein said detachable connector comprises a mechanical release.

24. A harness as in claim 21 further comprising a float attached to said first end of the detachable connector.

25. A harness as in claim 21 further comprising a float attached to said second end of the detachable connector.

26. A harness as in claim 25 further comprising a second float attached to said first end of the detachable connector.

27. A harness as in claim 21 further comprising a supplementary detachable connector located in the vessel portion of the supplementary vessel spur.

\* \* \* \* \*